(12) United States Patent
Nordsiek

(10) Patent No.: US 6,640,183 B2
(45) Date of Patent: Oct. 28, 2003

(54) METHOD FOR THE EVALUATION OF ROAD CLASSIFICATION IN NAVIGATION SYSTEMS

(75) Inventor: Walter Nordsiek, Holle (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/980,473

(22) PCT Filed: Mar. 30, 2001

(86) PCT No.: PCT/DE01/01206
§ 371 (c)(1),
(2), (4) Date: Mar. 22, 2002

(87) PCT Pub. No.: WO01/75397
PCT Pub. Date: Oct. 11, 2001

(65) Prior Publication Data
US 2003/0105582 A1 Jun. 5, 2003

(30) Foreign Application Priority Data
Mar. 30, 2000 (DE) .......................... 100 15 936

(51) Int. Cl.$^7$ ............................................. G01C 21/26
(52) U.S. Cl. .................. 701/200; 73/178 R; 701/210
(58) Field of Search ................. 701/200, 204, 701/210; 73/178 R

(56) References Cited

U.S. PATENT DOCUMENTS

| | | | | |
|---|---|---|---|---|
| 5,787,383 A | * | 7/1998 | Moroto et al. | 340/990 |
| 5,928,308 A | * | 7/1999 | Nanba et al. | 340/990 |
| 5,933,100 A | | 8/1999 | Golding | |
| 5,991,689 A | * | 11/1999 | Aito et al. | 701/201 |
| 6,255,963 B1 | * | 7/2001 | Heimann et al. | 340/539 |
| 6,256,580 B1 | * | 7/2001 | Meis et al. | 701/200 |

FOREIGN PATENT DOCUMENTS

| | | |
|---|---|---|
| DE | 30 21 624 | 12/1980 |
| DE | 37 24 516 | 2/1989 |
| DE | 693 09 295 | 7/1997 |
| DE | 196 50 844 | 6/1998 |
| DE | 198 06 197 | 8/1998 |
| DE | 199 41 648 | 6/2000 |
| EP | 0 292 897 | 11/1988 |
| EP | 0 702 210 | 3/1996 |
| EP | 0 987 665 | 3/2000 |
| WO | WO 99/24952 | 5/1999 |

* cited by examiner

Primary Examiner—William A. Cuchlinski, Jr.
Assistant Examiner—Olga Hernandez
(74) Attorney, Agent, or Firm—Kenyon & Kenyon

(57) ABSTRACT

A method for rating road classifications in navigational systems using fixed average speeds input into the system, to be replaced by or, if necessary, supplemented with continuously corrected, i.e., updated speed values.

15 Claims, 2 Drawing Sheets

METHOD FOR THE EVALUATION OF ROAD CLASSIFICATION IN NAVIGATION SYSTEMS

BACKGROUND INFORMATION

Although applicable to any information systems which involve rating of specific, time-variable system parameters, the present invention, as well as its underlying problem definition, are clarified with reference to a navigational system located on board an automobile.

Present-day navigational systems are essentially composed of the following subsystems: digital map, computational module for automatic route determination, position-finding device, system management, automotive sensor technology for recognizing vehicle movements, as well as input unit and output unit for the operation and guidance system.

In navigational systems having route guidance, to calculate the travel path, also referred to in the following as route, from the geographic coordinate S, usually representing the vehicle position, to another coordinate Z, as the destination, which is usually specified by the location, road or intersection and, in some instances by other information such as street number, one must rate (evaluate) the roads to be traveled, to achieve an "optimal" route guidance in accordance with a predefined criterion.

If the user of the system chooses "short route" as optimal, for example, then the criterion "search for the shortest drivable route" is stipulated for the system to calculate a route. Usually, however, such a stipulation (input) does not lead to an effective route guidance, for example when it comes to many overland routes via country roads or in larger cities having many "30 k.p.h. zones".

For that reason, a "fast" connection from S to Z is often considered to be optimal. In this context, "fast" means that for the route computation, the roads are classified by type, such as expressway, national highway, country road, etc. The individual road classifications in related-art navigational systems are then assigned fixed average speeds, such as 100 km/h for superhighways, 80 km/h for national highways, etc. The route computation is then set up to calculate a route having altogether a shortest possible driving time.

In addition, there is also information about the probable period of time until the destination is reached. This can be output to the user of the system, whether it be as a time span or as an estimated time of arrival.

Navigational systems of this kind are, however, static with respect to external conditions. They do not take into account the actual average speeds which are driven and which can be reached on the route. Furthermore, systems of this kind are not able to incorporate the user's driving habits in the route planning. For these reasons, they usually only provide imprecise information about the time until the destination is reached.

In addition, such a static assignment of average speeds to specific road sections often results in longer routes than a system user would desire or would select if he/she were to use a road map. Moreover, depending on the average speeds selected, the routes calculated by the system are often characterized by an unjustified preference for major roads, such as superhighways or national highways.

SUMMARY OF THE INVENTION

The method of the present invention has the advantage that, following a certain "transient recovery time", ("response time") the route calculation is able to generate better routes for the most frequently driven surrounding area. In most cases, this is associated with a shorter driving time. In addition, the routes calculated by the system are better adapted to the user's individual driving behavior. As a result, the time needed to reach a destination, as queried of the system or output by the system, is more accurate.

An idea underlying the present invention is for the above described, static rating of the road classifications using fixed average speeds input into the system, to be replaced by or, if necessary, supplemented with continuously corrected, i.e., updated speed values. In other words, instead of the fixed and invariably predefined road-classification speeds of the related art, actually reached speeds learned by the system during vehicle operation are, to an extent, used as a basis for route planning and estimating arrival time, etc. Because such average driving-speed values learned by the system are stored in a non-volatile memory, they are also available for a new route planning after the system is turned off.

For this, the information available during the driving operation, pertaining to the currently driven road classification and speed, is repeated, for instance at intervals of one second or longer, and set against one another, separately for each road classification. As a starting value for such a calculation, one may use, for example, the fixed average speed indicated above, or alternatively thereto, a speed to be entered by the driver into the system.

Thus, in accordance with the general aspect of the present invention, a dynamically adapted average value of the vehicle speed is used for calculating the route for one or more partial sections K of a particular driven road. The corresponding linking of database fields implemented in the navigational system is, therefore, also dynamic. The system adapts itself to the actually existing conditions.

In accordance with one preferred embodiment, a filtering takes place over time, in order to recalculate the average vehicle-speed value that is relevant to the rating. Such a filtering constitutes an especially simple implementation. In principle, however, other algorithms are also possible.

Another preferred embodiment provides for weighting the influence of this adaptation, variably, with respect to the recalculation. This makes it possible to minimize the effects of a "self-learning process" of the navigational system on the stored attribute values for the average speed of a particular road section K. This can be useful in the event of snowfall or other adverse weather conditions, so that rare, exceptional events do not become the basis of a self-learning process for the navigational system. In one simple variant, the user may choose, for example, between heavy, average, and weak weighting. Alternatively, other weighting factors may also be input by the user.

For this, the following schema is given:

When v(t0,K) is the fixed average speed preset for road classification K at the first system start-up; v(tn,K) is the adapted average speed calculated for road classification K at instant tn; v(tn+1) is the instantaneously driven speed and x the weighting factor, with which the old value in the particular case is linked to the new value, then, at instant tn+1, the instantaneously adapted average speed is obtained for K as $$v(t_{n+1}, K) = (1-x) \cdot v(t_n, K) + x \cdot v(t_{n+1}).$$

In this context, it does not matter whether the road classifications are actually rated in the "km/h" unit; what is important is the change in ratings as a function of values which are actually attained.

To be able to continue to use the values calculated within one driving cycle later on, provision is made to store them in a non-volatile memory.

Likewise provided is the introduction of upper and lower limits for each of the learned speeds; generally, this is more likely to result in unfavorable route proposals, for example, if the rating of an expressway were lower than that of a country road.

In accordance with another preferred embodiment, the method of the present invention may be improved by undertaking a separation into a so-called short-term and long-term adaptation, including different time constants and/or weightings xshort and xlong, respectively: the case of short-term adaptation, the intervals between tn and tn+i lie in the seconds range, and, in the case of long-term adaptation, in the minutes range. In accordance with this separation, the driven speed may be calculated within the selected period of time. The above-mentioned weighting factor x may also be selected to be greater or smaller, depending on whether it is practical to give the active speed value a greater or smaller influence in the recalculation of the average value. The values from the long-term adaptation are preferably used for the route calculation, and those from the short-term adaptation are used for updating the time indication until the destination is reached.

In accordance with another preferred embodiment, a starting value may be proposed by the system user for recalculating the average value that is relevant to the rating, and be entered by him/her into the system. This makes the system more flexible in its response to individual driving habits and to the configuration of individual road sections.

In accordance with another preferred embodiment, the method of the present invention may be simplified by an adaptation, without explicit consideration of the road classifications, only with respect to the average vehicle speed, including appropriate percentage increase or decrease in the rating factors of the individual road classifications. The average vehicle-speed value is then calculated on the basis of the current average vehicle-speed value, and the weighting of road classifications, preset by the system, loses influence. A measure of this kind likewise enhances the flexibility of the navigational system.

Another preferred embodiment provides for the user to be given a variably adjustable way to influence route proposals generated by the system, in order to minimize or eliminate the influence of values learned by the system. The method of the present invention may be supplemented in this manner using statistics pertaining to the length of the calculated routes and analysis thereof. when the user drives frequently in the neighborhood of his/her residence, for example in a congested area, then, due to increased traffic volume, such as rush-hour traffic, the adapted values are more likely to become low for the road classification rating. When the intention is to calculate a route to a more distant destination, it can then happen, under unfavorable conditions, that an inexpert route selection is made, for example, due to strong consideration of minor roads. In such a case, given such atypical destination distances, it would be more beneficial, for example, for part of the adaptation to be carried out by overriding the values learned by the system, towards starting values acquired from long-term experience or preset by the user.

BRIEF DESCRIPTION OF THE DRAWINGS

Exemplary embodiments of the present invention are illustrated in the drawings and are elucidated in the following description.

DETAILED DESCRIPTION

Figure 1:
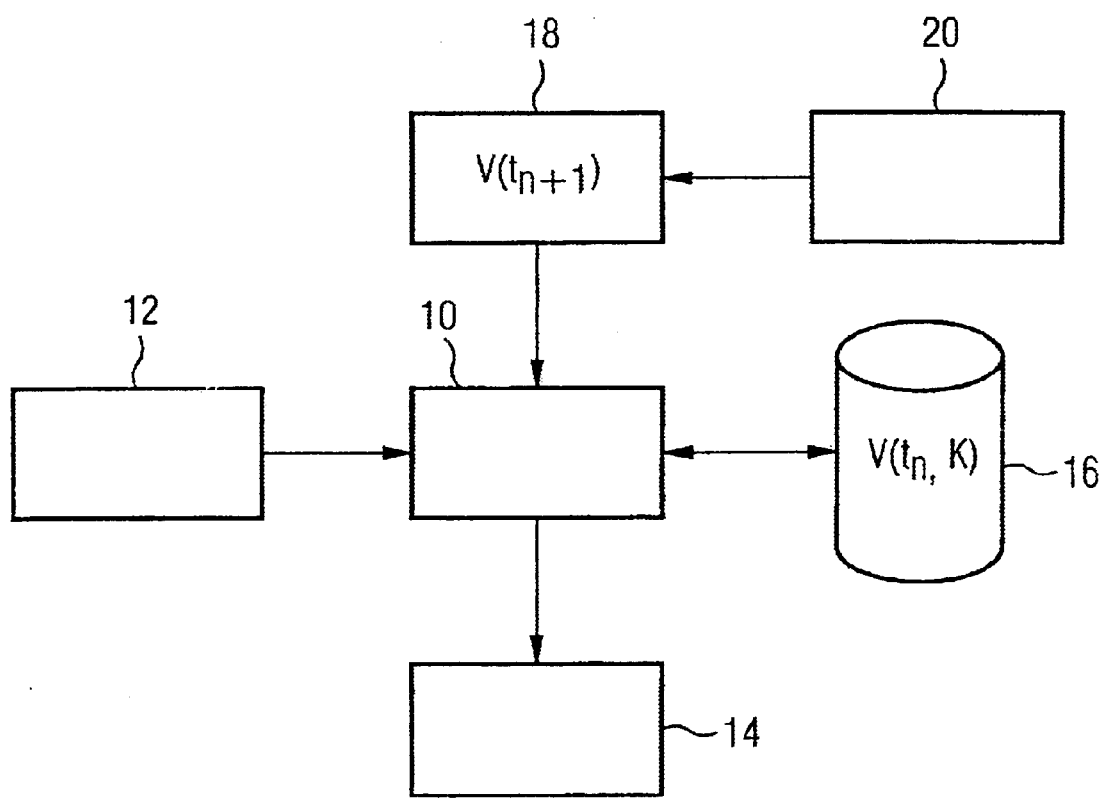
FIG. 1 shows a detail of a vehicle's navigational system including elements important to the present invention.

FIG. 1 shows a detail of a vehicle's navigational system including elements important to the present invention.

A processor 10 is linked to an input device 12 for inputting starting and destination locations, as well as for inputting other data. An output for the driver may follow optically and acoustically via an output device 14. This essentially includes a display and associated speakers.

In addition, processor 10 is connected to a memory 16. Processor 10 has read/write access to memory 16. Memory 16 is advantageously set up as a non-volatile memory. As described in greater detail below, it is intended for values of the instantaneous average vehicle speed, updated during travel, to be read out of this memory, and new values are to be written into it.

In addition, processor 10 is connected via an averaging unit 18 to the motor vehicle's speed signaling device 20. By way of the averaging unit, which may be a suitable, related-art logic circuit having integrating action, active, instantaneous speed values are read off from speed signaling device 20 and, following appropriate time intervals, combined to form an arithmetic, i.e., integrated average value that is of significance to the particular time interval.

Figure 2:
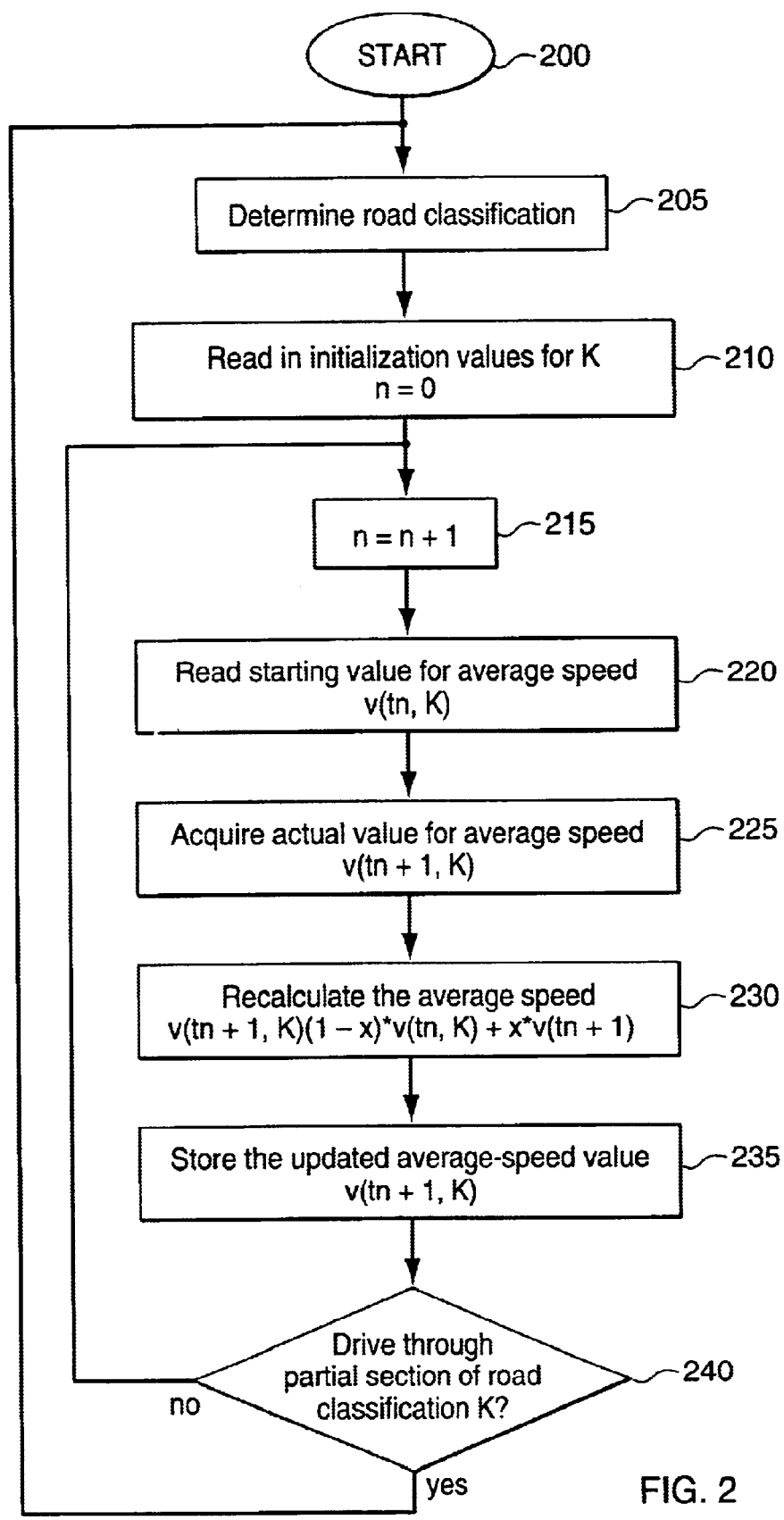
FIG. 2 shows a schematic block diagram including the steps of importance to the present invention, during travel, in accordance with a preferred exemplary embodiment.

FIG. 2 shows a schematic block diagram including the steps of importance to the present invention, during travel, in accordance with a preferred exemplary embodiment.

In a step 200, the user starts the system and, in a step 205, allows the system to determine road classification K. He/she may then enter the destination.

In accordance with the preferred functional sequence of the exemplary embodiment, as illustrated in FIG. 2, method steps for a specific road section K, treated as a unit, are repeated in an outer loop, whose loop body begins after step 200 and ends at decision 240. The average driving-speed values are repeated at specific instances tn, n=0, 1, 2 . . . This repetition is shown in the inner loop, beginning with step 215 and ending with step 240.

In step 210, n is set to 0, and all values specific to road section K (section of the driven road classification) are read in from the navigational system's database, in order to initialize all quantities which are important to the method. In a further step 215, n is increased by 1.

At the first pass through the inner loop, in a step 220, the above-mentioned starting value for the average speed is read out of memory 16. Subsequently, in a step 225, the average speed value present in averaging unit 18, which is based on the actually just driven speed specifications (data) from speed signaling device 20, is recorded by processor 10.

Average vehicle-speed value $v(t_{n+1},K)$, which is decisive for the rating, is subsequently calculated in accordance with the following formula:

$$v(t_{n+1},K)=(1-x).v(t_n,K)+x.v(t_{n+1}).$$

This newly calculated value is then stored as an updated value in memory 16, in step 235, and may now be used by the system for route calculations and/or to indicate the probable arrival time at the destination.

It is quite evident that, after one single pass through the inner loop, this newly calculated value is still not accurate enough. It is then determined in a step 240, whether the motor vehicle is still located on the same partial section or road section K. If this is not the case, the system loops back to step 215, and the method is continued, following the same sequence,—assuming a normal travel characteristic—the value stored in memory 16 becoming more and more realistic with every pass-through.

If this is not the case, preparations are made to be able to process the next partial section K. Depending on the navigational system's implementation method, the values relevant to this partial section K are read out of the database, and the system loops back to step 205. The method is then continued for this partial section, following the same principle.

The method ends with the switching off of the system.

The inner loop may preferably be passed through relatively often, per minute. Preferred values lie within an interval of between 60 times per minute and two times per minute.

The outer loop is repeated as many times as there are different road sections K on the route.

In the following, the advantageous effect of the method of the present invention is demonstrated on the basis of an exemplary calculation for a section from S to Z, it being possible to cover the section via two alternative routes.

Route A includes a 10 km country road (assumed average speed v(tO, county road) =60 km/h), 80 km of expressway (100 km/h), and, again, of 10 km county road.

The alternative route B includes, altogether, 30 km of county road and 60 km of national highway (80 km/h).

Given fixed average speeds, this yields route A over the expressway (fast route), which is, however, 10 km longer than route B:

| Route A | |
| --- | --- |
| 20 km county road | 20 min |
| 80 km expressway | 48 min |
| | 68 min |
| Route B | |
| 20 km county road | 30 min |
| 60 km national highway | 45 min |
| | 75 min |

The road classification rating in accordance with the given exemplary embodiment is now able to distinguish among different cases:

The user frequently drives in an area and at a time of day in which the expressway is usually congested; the average speed is "learned downward" to 80 km/h; therefore, the path via the national highway proves to be the better route:

| Route A | |
| --- | --- |
| 20 km county road | 20 min |
| 80 km expressway | 60 min |
| | 80 min |
| Route B | |
| 20 km county road | 30 min |
| 60 km national highway | 45 min |
| | 75 min |

Even when the national highways driven at average speeds appear to be faster than expected (95 km/h), the rating, altered by adaptation, leads to route B, even though the advantage is minimal in this example.

| Route A | |
| --- | --- |
| 20 km county road | 20 min |
| 80 km expressway | 48 min |
| | 68 min |
| Route B | |
| 30 km county road | 30 min |
| 60 km national highway | 37 min |
| | 67 min |

If the system user prefers a speedy style of driving and if available expressways are found—the average speed is raised to 120 km/h —, the error at the 11% level in the route's time indication is compensated through adaptation of the road's rating:

| Fixed values | |
| --- | --- |
| 20 km county road | 20 min |
| 80 km expressway | 48 min |
| | 68 min |
| Adapted values | |
| 20 km county road | 20 min |
| 80 km expressway | 40 min |
| | 60 min |

The short-term adaptation mentioned and described above is able to correct the time indication in the event of traffic jams even more effectively and make the adaptation to the prevailing road condition.

Although the present invention is described above with reference to a preferred embodiment, it is not limited thereto, but instead may be modified in a variety of ways.

For example, the frequency with which the inner loop is passed through may be adapted to the navigational system's computing capacity. In addition, other mathematical algorithms may be employed to provide values which are usable to the system from the multiplicity of average speed values read in from the speed signaling device via the average-value generator. In this case, various filter functions may be useful.

In addition, the system may be equipped in a practical manner with an additional option which allows one to temporarily discontinue with the method of the present invention and, instead, to revert to standard road-classification rating values present in the system. Here, the benefit is derived that the system does not learn "incorrectly", for example, when the driver stops somewhere along the route to purchase something, or if he/she makes some other kind of atypical intermediate stop.

When the vehicle is turned off (ignition off), the navigational unit is usually switched off and/or is set to a stand-by mode. A temporary method for switching off the unit may also be provided during operation as a towing vehicle (towing, trailer towing).

What is claimed is:

1. A method for rating road classifications in a vehicle navigational system, comprising:

assigning an average vehicle-speed value to at least one partial section of a particular driven road, for rating purposes; and performing a recalculation and an updating of the average vehicle speed value relevant to the rating, during travel, at repeated instants in accordance with actually reached speeds.

2. The method according to claim 1, further comprising:

filtering, for the recalculation, over time for the average vehicle-speed value relevant to the rating.

3. The method according to claim 1, further comprising:

variable weighting an influence of an adaptation of the recalculation.

4. The method according to claim 1, further comprising:

displaying an arrival time at a destination using a short-term adaptation, including a low time constant, wherein the recalculation of the average vehicle-speed value takes place using a long-term adaptation, including a larger time constant.

5. The method according to claim 1, further comprising:

proposing, by a system user, a starting value for the recalculation of the average value relevant to the rating.

6. The method according to claim 1, further comprising:

using an active average value as a base quantity; and accounting for different road classifications using percentage changes for the recalculation of the average vehicle-speed value.

7. The method according to claim 1, further comprising:

giving a user a variably adjustable way to influence route proposals to be generated by the system, in order to reduce an influence of values learned by the system.

8. A method for rating road classifications in a vehicle navigational system, comprising:

assigning an average vehicle-speed value to at least one partial section of a particular driven road, for rating purposes;

adapting the average vehicle-speed value relevant to the rating, during travel, at repeated instants in accordance with actually reached speeds, through a recalculation; and filtering, for the recalculation, over time for the average vehicle-speed value relevant to the rating.

9. A method for rating road classifications in a vehicle navigational system, comprising:

assigning an average vehicle-speed value to at least one partial section of a particular driven road, for rating purposes;

adapting the average vehicle-speed value relevant to the rating, during travel, at repeated instants in accordance with actually reached speeds, through a recalculation; and variable weighting an influence of an adaptation on the recalculation.

10. A method for rating road classifications in a vehicle navigational system, comprising:

assigning an average vehicle-speed value to at least one partial section of a particular driven road, for rating purposes;

adapting the average vehicle-speed value relevant to the rating, during travel, at repeated instants in accordance with actually reached speeds, through a recalculation; and displaying an arrival time at a destination using a short-term adaptation, including a low time constant;

wherein the recalculation of the average vehicle-speed value takes place using a long-term adaptation, including a larger time constant.

11. A method for rating road classifications in a vehicle navigational system, comprising:

assigning an average vehicle-speed value to at least one partial section of a particular driven road, for rating purposes;

adapting the average vehicle-speed value relevant to the rating, during travel, at repeated instants in accordance with actually reached speeds, through a recalculation; and proposing, by a system user, a starting value for the recalculation of the average value relevant to the rating.

12. A method for rating road classifications in a vehicle navigational system, comprising:

assigning an average vehicle-speed value to at least one partial section of a particular driven road, for rating purposes;

adapting the average vehicle-speed value relevant to the rating, during travel, at repeated instants in accordance with actually reached speeds, through a recalculation; and using an active average value as a base quantity and taking into account different road classifications using percentage changes, for the recalculation of the average vehicle-speed value.

13. The, method according to claim 1, further comprising:

giving a user a variably adjustable way to influence route proposals to be generated by the system, in order to reduce an influence of values learned by the system.

14. A method for rating a road classification in a navigational system in a motor vehicle, comprising:

assigning an average vehicle-speed value of the motor vehicle to at least one partial section of a particular road being driven on by the motor vehicle;

adapting an average value of a vehicle speed relevant to a rating during travel by recalculating at repeated instants according to an actually reached speed; and rating the average vehicle-speed for the road classification of the particular road being driven on by the motor vehicle.

15. The method of claim 14, wherein the road classifications include at least one of a country road, an expressway, a rural route, a federal highway, an interstate highway and a state route.

* * * * *

UNITED STATES PATENT AND TRADEMARK OFFICE
CERTIFICATE OF CORRECTION

PATENT NO. : 6,640,183 B2
DATED : October 28, 2003
INVENTOR(S) : Walter Nordsiek It is certified that error appears in the above-identified patent and that said Letters Patent is hereby corrected as shown below:

Column 2,
Line 62, change "$\ldots=(1-x).v(t_n,K)+x.v(t_{n+1})$." to -- $\ldots=(1-x)\cdot v(t_n,K)+x\cdot v(t_{n+1})$. --

Column 4,
Line 58, change "$\ldots(1-x).v(t_n,K)+x.v(t_{n+1})$." to -- $\ldots=(1-x)\cdot v(t_n,K)+x\cdot v(t_{n+1})$. --

Signed and Sealed this

Twenty-eighth Day of June, 2005

JON W. DUDAS
*Director of the United States Patent and Trademark Office*